May 23, 1961

G. J. GOLDSMITH 2,985,759

FERROELECTRIC DEVICES

Filed Sept. 26, 1956

INVENTOR.
George J. Goldsmith
BY
J. L. Whittaker
ATTORNEY

United States Patent Office 2,985,759

Patented May 23, 1961

2,985,759

FERROELECTRIC DEVICES

George J. Goldsmith, Princeton, N.J., assignor to Radio Corporation of America, a corporation of Delaware Filed Sept. 26, 1956, Ser. No. 612,134

6 Claims. (Cl. 250—83.3)

This invention relates to improved ferroelectric devices and particularly, but not necessarily exclusively, to improved ferroelectric devices including a body of the mineral colemanite as the active ferroelectric material.

A ferro electric material is a material which displays a spontaneous polarization of electric dipoles that can be reversed by an attainable electric field. This is manifested by a ferroelectric hysteresis loop when the polarization of a crystal of the material is plotted against an applied electric field. Some previously known ferroelectrics are: Rochelle salt, potassium dihydrogen phosphate, barium titanate, and guanidine aluminum sulfate hexahydrate.

For commercial uses, the ferroelectric material should be easily prepared or obtained as discrete crystals, should require a reasonable coercive electric field to reverse the spontaneous polarization, should have a high polarization, and should have a square hysteresis loop.

One object of the invention is to provide improved ferroelectric devices.

Another object is to provide improved ferroelectric devices useful for commercial purposes.

Colemanite, a common mineral, has been found to posses the unusual and unexpected property of ferroelectricity. The ferroelectric properties occur parallel to the 010 crystallographic axis of crystals of these materials.

An improved device of the invention which uses the newly discovered ferroelectric properties includes a body of colemanite and means for applying an electric field to said body. A typical device comprises a crystal of colemanite spacing a pair of electrodes, said electrodes capable of producing a substantial electric field parallel to the 010 axis of said crystal when connected to a suitable source of voltage.

Figures 1, 2, 3:
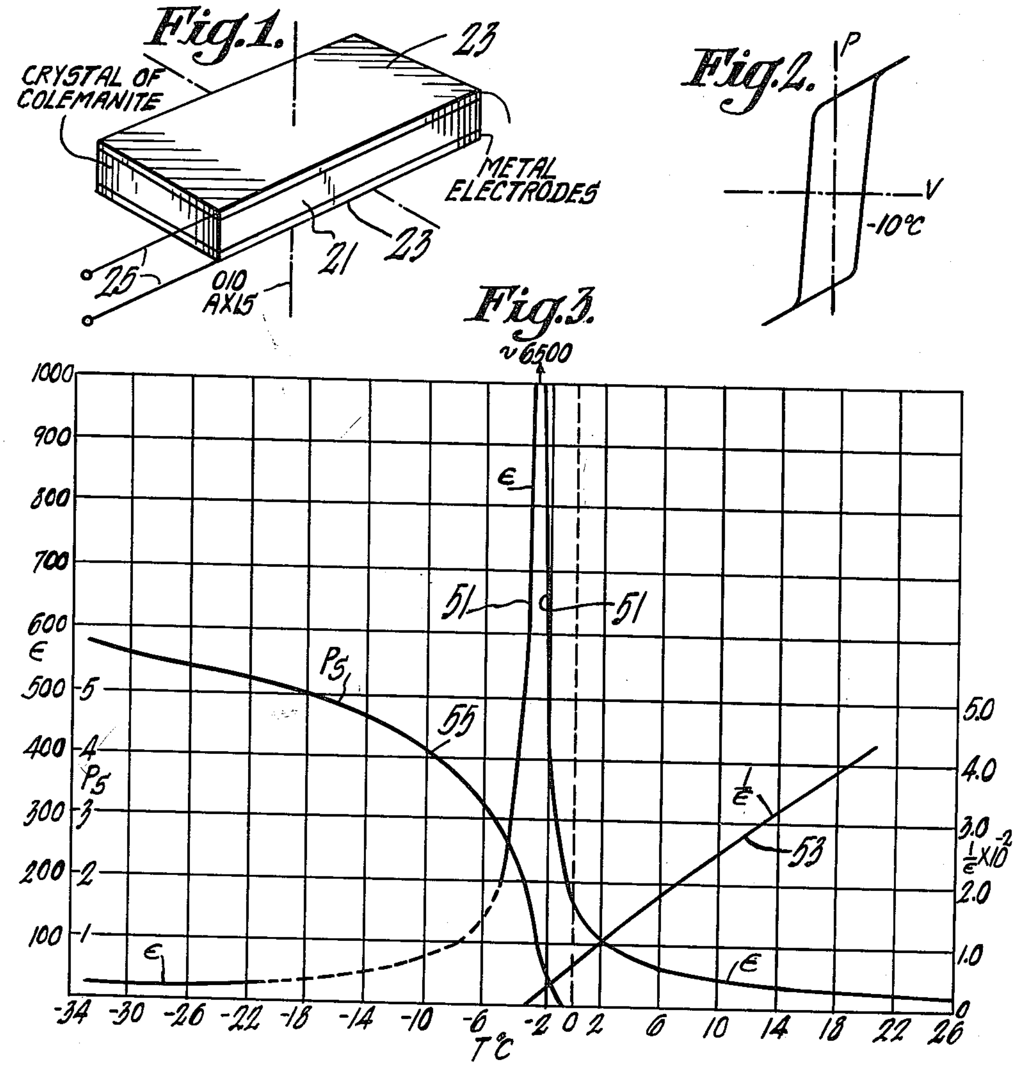
Figure 4:
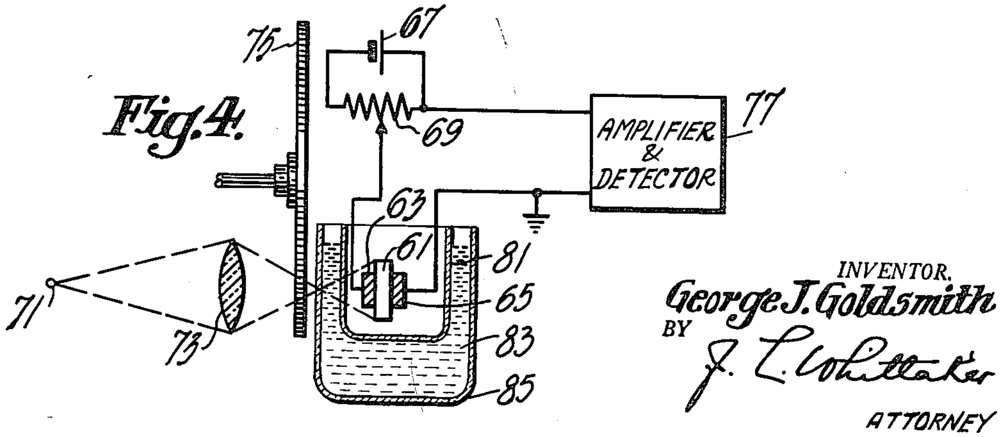

The invention will now be described in greater detail by reference to the accompanying drawing in which:

Figure 1 is a crystal of colemanite with electrodes applied to opposite faces which lie in planes perpendicular to the 010 axis of the crystal, Figure 2 is a typical curve illustrating the ferroelectric hysteresis of the device of Figure 1, Figure 3 is a set of curves illustrating the dielectric constant $\epsilon$, the reciprocal of dielectric constant $1/\epsilon$ and spontaneous polarization $P_s$ of colemanite with respect to temperature, and Figure 4 is a system illustrating the use of the ferroelectric properties of colemanite for the detection of infra-red radiation.

*Example.*—To prepare suitable crystals of colemanite, cleave a single crystal body of the mineral along a plane perpendicular to the 010 monoclinic axis. This is the easy cleavage direction of the material.

Referring to Figure 1, electrodes 23 are applied to opposite crystal faces which lie in the plane perpendicular to the 010 axis of one of the colemanite crystals 21. Electrodes are most conveniently prepared by applying a quantity of air drying silver paste upon the surfaces to be electroded. Such silver paste may comprise, for example, silver particles dispersed in a suitable binder such as cellulose nitrate. Another method for producing electrodes is to evaporate a noble metal, such as silver, in a vacuum upon the surfaces to be electroded. Other metals, such as gold, platinum, and indium, may be used as the electrode material. It is preferable, but not necessary, to adherently attach the electrode material to the surfaces of the crystal. Optionally, the electrodes may be physically separate from the crystal and merely applied to the surface thereof. Electrodes which make good electrical contact uniformly to the crystal surface are preferred so that there is a negligible capacitance between the crystal 21 and the electrode 23. Lead wires 25 are attached to each of the electrodes 23. The electroded crystal is now ready for use as a ferroelectric device.

An electroded crystal about 0.5 mm. thick is cooled to a temperature below about —10° C. and connected to a voltage source (not shown). Upon applying a 60 cycle A.C. peak voltage of about 300 volts, the device exhibits a square, symmetric ferroelectric hysteresis loop. Referring to Figure 2, there is shown the ferroelectric hysteresis loop of the electroded crystal of Figure 1 at about —10° C. The ordinate represents the polarization P in microcoulombs/cm.$^2$ and the abscissa represents the applied field V in volts. In Figure 2, the spontaneous polarization is about 0.5 microcoulombs/cm.$^2$ and the coercive voltage is about 300 volts. This corresponds to a coercive field of about 6000 volts/cm. The Curie temperature of colemanite is believed to be about —2.5° C.

Colemanite is a mineral having the composition $CaB_3O_4(OH)_3 \cdot H_2O$. It occurs naturally in California and Nevada. It may also be synthesized. It is monoclinic, space group $$C^5_{2H} - P_{2_{1/A}}$$

at room temperature. The crystallographic properties of colemanite are discussed in C. L. Christ, Joan R. Clark and H. T. Evans, Jr., Acta Cryst. 7, 453 (1954) and C. L. Christ, Am. Mineralogist, 38, 411 (1953). It is representative of a new class of ferroelectric materials not previously known.

A summary of its dielectric and ferroelectric properties with respect to temperature is given in Figure 3. Curves 51 and 53 plot dielectric constant $\epsilon$ and reciprocal of dielectric constant $1/\epsilon$ respectively with respect to temperature. Note that the dielectric constant $\epsilon$ in the range above the transition temperature follows the anticipated Curie-Weiss behavior as shown by the $1/\epsilon$ plot. Moreover, with reference to the $\epsilon$ plot of the curve 51 there is a very pronounced anomaly in the dielectric constant which is unusually steep-sided and narrow. In the ferroelectric range, the dielectric constant returns to the value found in the paraelectric region. A curve 55 plots spontaneous polarization vs. temperature. The curve 55 displays the characteristic behavior of a second order transition and there is coincidence in temperature between the dielectric peak and the zero point of the spontaneous polarization, an additional indication of a second order transition.

The table lists colemanite and the representatives of previously known classes of ferroelectric materials. The table also lists some physical and ferroelectric properties of each of these materials.

TABLE

*Properties of representatives of the known classes of ferroelectrics*

| Substance | Formula | Crystal Structure [1] | $P_s$ | $T_c$ | $E'_{fe}$ | $E_c$ |
|---|---|---|---|---|---|---|
| Colemanite | $CaB_3O_4(OH)_3.H_2O$ | monoclinic | 0.5 | 270.5° | 20 | 6,000 |
| Thiourea | $SC(NH_2)_2$ | orthorhombic | 3.2 | 103° | 100 | 300 |
| Barium titanate | $BaTiO_3$ | tetragonal | 26 | 393° | 160 | 500 |
| Rochelle salt | $KNaC_4H_4O_6.4H_2O$ | monoclinic | 0.24 | [2] 297°, 255° | 4,000 | 1,000 |
| Potassium dihydrogen phosphate | $KH_2PO_4$ | tetragonal | 4.95 | 123° | 21 | 1,000 |
| Guanidine aluminum sulfate | $C(NH_2)_3Al(SO_4)_2.6H_2O$ | trigonal | 0.35 | >373° | 6 | 3,000 |
| Methyl-ammonium aluminum alum | $(CH_3NH_3)Al(SO_4)_2.12H_2O$ | cubic | 0.6 | 176° | 9 | 5,000 |
| Ammonium sulfate | $(NH_4)_2SO_4$ | orthorhombic | 0.25 | 223.5° | ------ | ------ |
| Ammonium cadmium sulfate | $(NH_4)_2(Cd)_2(SO_4)_3$ | cubic | 0.3 | 103° | 9 | ------ |

[1] Crystal structure 293° K.
[2] Rochelle salt has two Curie temperatures between which it is ferroelectric.
$P_s$—maximum spontaneous polarization in microcoulombs/cm.².
$T_c$—Curie temperature in degrees Kelvin.
$E'_{fe}$—small signal dielectric constant at about 300° K. along ferroelectric axis.
$E_c$—estimated coercive field at 60 cycles in volts/cm.

The ferroelectric devices of the invention are useful in various applications, for example, in conjunction with electroluminescent systems, computers, electronic memory devices and binary switches. Such ferroelectric devices are discussed in more complete detail in H. Sachse, Ferroelektrica, Springer-Varlag, OHB, Berlin, Germany, 1956, pp. 144 to 156.

One use for the ferroelectric properties of colemanite is in the detection of infra-red (heat) radiation. The principle of this process is the following. In a material the spontaneous polarization of which is strongly temperature dependent, a change in temperature will result in a change in free surface charge and hence a flow of current in an external circuit by the relationship:

$$i \propto \left(\frac{dP_s}{dt}\right) \propto \left[\left(\frac{dP_s}{dT}\right)\left(\frac{dT}{dt}\right)\right]_{-T=T}$$

where: $i$ is the current, $t$ is the time, T is temperature and $P_S$ is sponstaneous polarization.

Thus, for a given rate of change of temperature produced, for example, by a shutter modulating a source of infra-red, the current observed is proportional to $dP_S/dT$. In all ferroelectric materials $dP_S/dT$ is a maximum in the region of the transition. The particular utility of colemanite for this application lies in the fact that the transition temperature (—2.5° C.) is one which is easily maintained by a salt-ice water thermostat. Furthermore, it is also characteristic of ferroelectrics that the region of steepest slope of the $P_S$ vs. T curve can be shifted upward in temperature by the application of an external electric field. Hence with colemanite the operation as an infra-red detector can be optimized by the appropriate combination of a salt-ice water bath and an external D.C. field.

Referring to Figure 4, a body of colemanite 61 is placed between a transparent electrode 63 and another electrode 65 and placed in a first transparent container 81 which in turn is immersed in a salt-ice water mixture 83 in a second transparent container 85. An optimizing potential is applied to the electrodes through an external circuit by a battery 67 and a rheostat 69. A light pulse including infra-red radiation is directed upon the body 61, for example, from a source 71 through a lens 73 and a rotating shutter 75. When the light pulse strikes the body 61, a current pulse passes through the external circuit and is observed in an amplifier and detector 77.

There have been described improved ferroelectric devices including a body of colemanite.

What is claimed is:

1. A ferroelectric device comprising a body of colemanite, and means for applying an electric field to said body.

2. A ferroelectric device comprising a crystal of colemanite and means for applying an electric field having a substantial component parallel to the 010 axis of said crystal.

3. A ferroelectric device comprising a crystal of colemanite spacing a pair of electrodes, said electrodes capable of producing a substantial electric field parallel to the 010 axis of said crystal.

4. An infra red radiation detection device comprising a body of colemanite, means for applying an electric field to said body, means directing radiation upon said body, and means for detecting a change in free surface charge in said body.

5. An infra red radiation detection device comprising a pair of electrodes, a crystal of colemanite spacing said pair of electrodes, said electrodes adapted to produce a substantial electric field parallel to the 010 axis of said crystal, connection means for a source of voltage attached to said electrodes, optical means for directing electromagnetic radiation upon said crystal, and means for detecting a change in free surface charge in said body.

6. An infra red radiation detection device comprising a pair of electrodes, a crystal of colemanite spacing said pair of electrodes, said electrodes adapted to produce a substantial electric field parallel to the 010 axis of said crystal, means for maintaining said crystal at a temperature below —2.5° C., connection means for a source of voltage attached to said electrodes, optical means for directing electromagnetic radiation upon said crystal, and means for detecting a change in free surface in said body.

References Cited in the file of this patent

UNITED STATES PATENTS

| | | |
|---|---|---|
| 2,510,397 | Hansell | June 6, 1950 |
| 2,678,400 | McKay | May 11, 1954 |
| 2,698,928 | Pulvari | Jan. 4, 1955 |